(12) United States Patent
Nozawa (10) Patent No.: US 7,693,400 B2
(45) Date of Patent: Apr. 6, 2010

(54) IMAGING APPARATUS, RECORDING APPARATUS AND RECORDING METHOD

(75) Inventor: Shingo Nozawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1392 days.

(21) Appl. No.: 10/715,428

(22) Filed: Nov. 19, 2003

(65) Prior Publication Data

US 2004/0109678 A1 Jun. 10, 2004

(30) Foreign Application Priority Data

Nov. 22, 2002 (JP) .............................. 2002-339759

(51) Int. Cl.
*H04N 7/26* (2006.01)
(52) U.S. Cl. ..................... 386/109; 386/111; 386/117
(58) Field of Classification Search .............. 386/111, 386/117, 109
See application file for complete search history.

(56) References Cited

U.S. PATENT DOCUMENTS

| | | | | |
|---|---|---|---|---|
| 5,774,624 | A * | 6/1998 | Enari | 386/111 |
| 5,953,456 | A | 9/1999 | Ikeda et al. | 382/232 |
| 5,963,678 | A | 10/1999 | Nozawa | 382/299 |
| 6,057,893 | A * | 5/2000 | Kojima et al. | 348/700 |
| 6,360,018 | B1 | 3/2002 | Nozawa | 382/248 |
| 6,498,896 | B1 | 12/2002 | Enari | 386/109 |
| 6,556,627 | B2 * | 4/2003 | Kitamura et al. | 375/240.26 |
| 6,587,505 | B1 | 7/2003 | Nozawa et al. | 375/240 |
| 2004/0076399 | A1 | 4/2004 | Arai et al. | 386/46 |

FOREIGN PATENT DOCUMENTS

| | | |
|---|---|---|
| CN | 1255706 A | 6/2000 |
| EP | 1005042 | 5/2000 |
| JP | 08-331448 | 12/1996 |
| JP | 10-285501 | 10/1998 |
| JP | 10-322660 | 12/1998 |
| JP | 2000-138900 | 5/2000 |
| JP | 3163700 B2 | 5/2001 |

* cited by examiner

*Primary Examiner*—Marsha D Banks Harold
*Assistant Examiner*—Daniel Tekle
(74) *Attorney, Agent, or Firm*—Fitzpatrick, Cella, Harper & Scinto (57) ABSTRACT

An imaging apparatus for encoding a moving picture signal output by imaging means using intraframe encoding and interframe encoding. An encoded image signal which includes picture groups comprising n frames of an image signal including intraframe-encoded pictures and interframe-encoded pictures is generated. An instruction starts a recording of the encoded image signal. The encoded image signal is transmitted to an external device while the signal is in an encoded state and the encoded image signal is transmitted to an external device while the encoded image signal is not being recorded. Upon detection of the instruction during transmission of the encoded image signal to the external device, recording of the encoded image signal starts, from the leading end of a picture group that contains a frame, corresponding to the instruction.

10 Claims, 5 Drawing Sheets

IMAGING APPARATUS, RECORDING APPARATUS AND RECORDING METHOD

FIELD OF THE INVENTION

This invention relates to an imaging apparatus for capturing video, and to a recording apparatus and method for recording an image.

BACKGROUND OF THE INVENTION

Advances in digital signal processing technology in recent years have made it possible to subject a large quantity of information, such as moving pictures, still images and voice, to high-efficiency digital encoding, and to record the encoded information on a small magnetic recording medium or small optical recording medium or send the encoded information to a communication medium. Such technology has undergone further expansion and an imaging apparatus capable of easily capturing high-quality video and outputting the video promptly to a communication medium has been developed.

Figure 4:
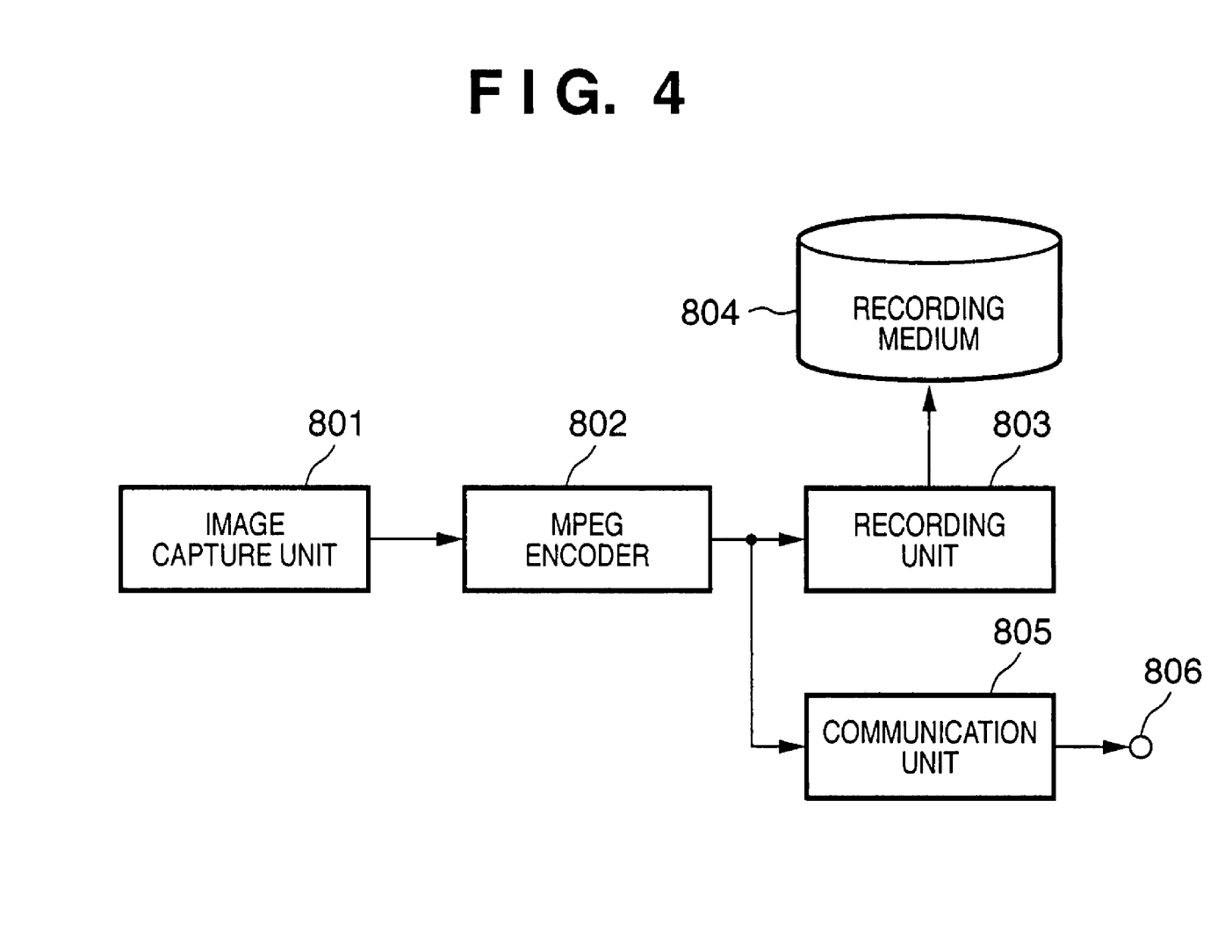
FIG. 4 is a block diagram illustrating an example of the structure of an imaging apparatus according to the prior art.

The MPEG encoding technique is in wide use for the encoding of moving pictures at the present time. FIG. 4 illustrates an example of an imaging apparatus that uses the MPEG encoding technique. A video signal that has been captured by an image sensor 801 is supplied to an MPEG encoder 802. MPEG encoding employs intraframe encoding in which encoding is performed using correlation within the same frame, and interframe encoding in which encoding is performed using correlation between frames.

Figure 5:
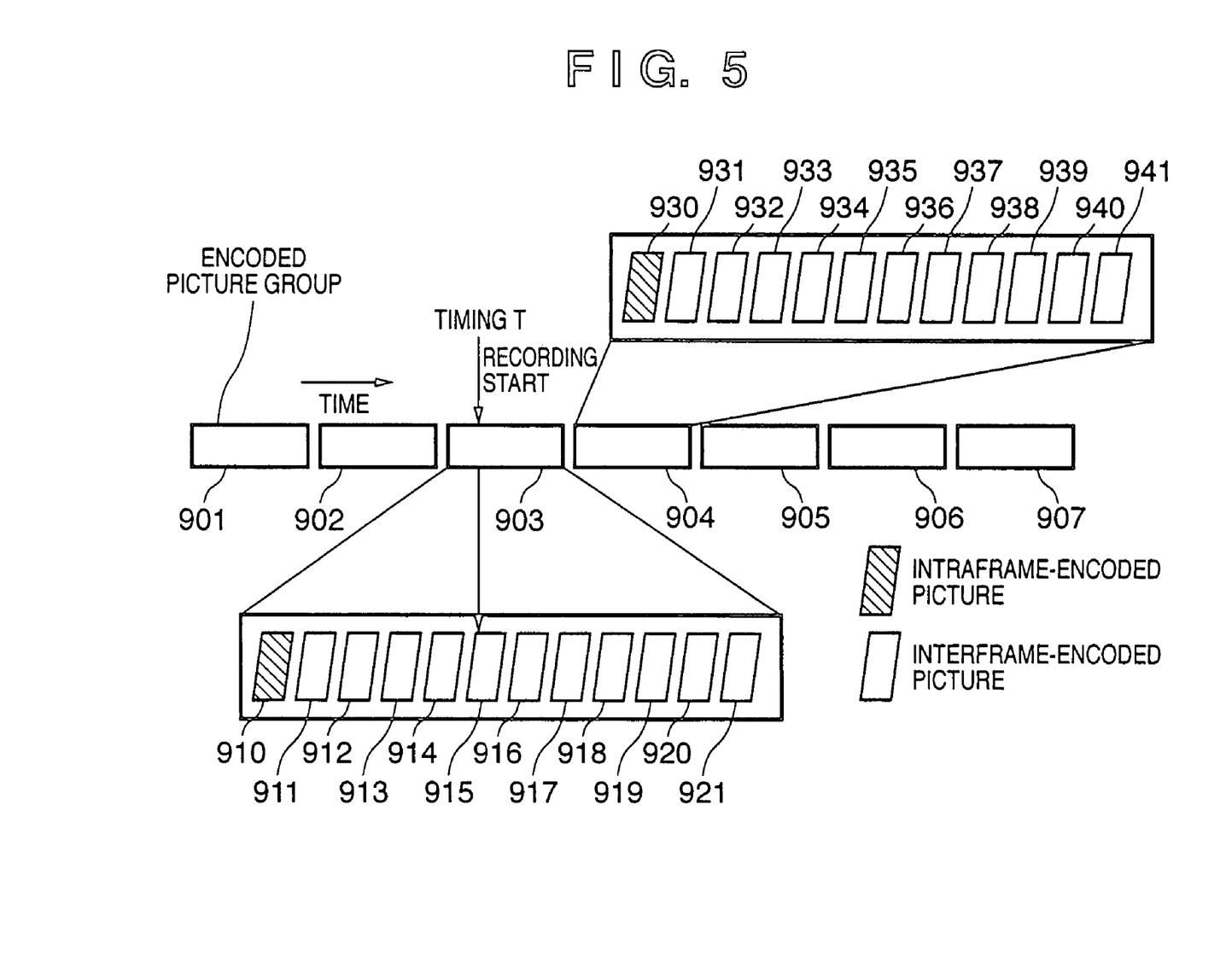
FIG. 5 is a diagram useful in describing the operation of recording processing by the imaging apparatus according to the prior art.

FIG. 5 is a diagram illustrating an example of the structure of encoded data that is output from the MPEG encoder 802. Reference numerals 910, 930 in FIG. 5 denote I pictures that have undergone intraframe encoding, and reference numerals 911 to 921 and 931 to 941 denote pictures that have undergone interframe encoding. These interframe-encoded pictures comprise P pictures, which are images that have undergone interframe predictive encoding in the forward direction, and B pictures, which are images that have undergone interframe predictive encoding bidirectionally. These pictures are output collectively in picture groups (GOP) 901 to 907 each having a prescribed number of pictures and classification. Each single picture group contains at least one I picture, and the interframe-encoded pictures are reproduced based upon the I-picture information.

The video thus encoded is supplied to a recording unit 803 and is stored on any recording medium 804. At the same time, the encoded video is supplied to a communication unit 805 and is transmitted to the exterior of the imaging apparatus from a stream output terminal 806. This imaging apparatus not only stores video on a recording medium but also can be used in various applications, such as in distribution of video and in TV telephones, by connecting the stream output terminal to a computer or television.

Consider a case where the start of recording on the recording medium 804 has been commanded via a control panel (not shown) while transmission of encoded data from the stream output terminal 806 is in progress in an imaging apparatus of this kind. For example, consider a case where start of recording has been commanded at the timing T in FIG. 5, i.e., at a timing that corresponds to picture 915 in the picture group 903.

In this case, data from the interframe-encoded picture 915 is stored on the recording medium 804 partway through the picture group 903. The picture groups shown in FIG. 5 are such that one I picture in each group is included at the leading end of the group. As a consequence, the intraframe-encoded I picture 910 is lost without being recorded in the picture group 903 from which recording started in mid course. This means that the interframe-encoded pictures 915 to 921 contained in the same frame cannot be decoded correctly despite the fact that they were recorded normally.

In this example of the prior art, therefore, a picture group that cannot be decoded correctly occurs with almost absolute certainty at the beginning of each unit of photography, and a problem which arises is that at the time of playback, the image freezes for a period of time corresponding to the leading picture group. In order to solve this problem, Japanese Patent No. 3163700 (JP-B-3163700, corresponding U.S. Pat. No. 5,774,624) proposes generating a picture group afresh from the record-start command and arranging it so that an I picture is always included in the leading picture group regardless of the timing at which recording is started.

With the technique described in the above-mentioned patent specification, the image that has been recorded on the recording medium can be reproduced correctly from the leading end. However, consider the encoded data that was being output from the MPEG encoder 802 to the stream output terminal. If recording was commanded partway through a picture group, now the picture group at the stream output will be split up. For example, there are instances where a P picture necessary to reproduce a B picture is lost. Thus, it has not been possible to produce an encoded output that can enable problem-free reproduction in terms of both recording and transmission.

SUMMARY OF THE INVENTION

Accordingly, the principal object of the present invention is to suppress loss of video at playback with regard to both an encoded video signal that is transmitted and an encoded video signal that is recorded even in a case where recording has been commanded with regard to a video signal during the transmission of this video signal encoded using both intraframe encoding and interframe encoding.

According to an aspect of the present invention, an imaging apparatus comprising: imaging means; encoding means for encoding a moving picture signal, which has been output by the imaging means, using intraframe encoding and interframe encoding, and generating an encoded image signal comprising a plurality of picture groups each comprising n (where n represents an integer equal to or greater than 2) frames of an image signal including intraframe-encoded pictures obtained by the intraframe encoding and interframe-encoded pictures obtained by the interframe encoding; recording means for recording the encoded image signal, which has been generated by the encoding means, on a recording medium; and control means for controlling the recording means in accordance with a command to start recording of the moving picture signal so as to start recording from the leading end of a picture group that contains a frame, which corresponds to the record-start command, in the moving picture signal that has been output from the imaging means.

According to another aspect of the present invention, an imaging apparatus comprising: imaging means; encoding means for encoding a moving picture signal, which has been output by the imaging means, using intraframe encoding and interframe encoding, and generating an encoded image signal comprising a plurality of picture groups each comprising n (where n represents an integer equal to or greater than 2) frames of an image signal including intraframe-encoded pictures obtained by the intraframe encoding and interframe-encoded pictures obtained by the interframe encoding; recording means for recording the encoded image signal, which has been generated by the encoding means, on a recording medium; transmitting means for transmitting the encoded image signal, which has been generated by the encoding means, to an external device while the signal is in the encoded state; and control means for controlling the recording means, in accordance with a command to start recording of the moving picture signal during transmission of the encoded image signal by the transmitting means, so as to start recording from the leading end of a picture group that contains a frame, which corresponds to the record-start command, in the moving picture signal that has been output from the imaging means.

According to further aspect of the invention, an imaging apparatus comprising: imaging means; encoding means for encoding a moving picture signal, which has been output by the imaging means, using intraframe encoding and interframe encoding, and generating an encoded image signal comprising a plurality of picture groups each comprising n (where n represents an integer equal to or greater than 2) frames of an image signal including intraframe-encoded pictures obtained by the intraframe encoding and interframe-encoded pictures obtained by the interframe encoding; recording means for recording the encoded image signal, which has been generated by the encoding means, on a recording medium; and control means for controlling the recording means in accordance with a command to start recording of the moving picture signal so as to start recording from a picture group that follows a picture group that contains a frame, which corresponds to the record-start command, in the moving picture signal that has been output from the imaging means.

According to yet another aspect of the present invention, an imaging apparatus comprising: imaging means; encoding means for encoding a moving picture signal, which has been output by the imaging means, using intraframe encoding and interframe encoding, and generating an encoded image signal comprising a plurality of picture groups each comprising n (where n represents an integer equal to or greater than 2) frames of an image signal including intraframe-encoded pictures obtained by the intraframe encoding and interframe-encoded pictures obtained by the interframe encoding; recording means for recording the encoded image signal, which has been generated by the encoding means, on a recording medium; transmitting means for transmitting the encoded image signal, which has been generated by the encoding means, to an external device while the signal is in the encoded state; and control means for controlling the recording means, in accordance with a command to start recording of the moving picture signal during transmission of the encoded image signal by the transmitting means, so as to start recording from a picture group that follows a picture group that contains a frame, which corresponds to the record-start command, in the moving picture signal that has been output from the imaging means.

According to another aspect of the present invention, a recording apparatus comprising: input means for inputting a moving picture signal; encoding means for encoding the moving picture signal, which has been input by the input means, using intraframe encoding and interframe encoding, and generating an encoded image signal comprising a plurality of picture groups each comprising n (where n represents an integer equal to or greater than 2) frames of an image signal including intraframe-encoded pictures obtained by the intraframe encoding and interframe-encoded pictures obtained by the interframe encoding; recording means for recording the encoded image signal, which has been generated by the encoding means, on a recording medium; and control means for controlling the recording means in accordance with a command to start recording of the moving picture signal so as to start recording from the leading end of a picture group that contains a frame, which corresponds to the record-start command, in the moving picture signal that has been output from the input means.

According to another aspect of the present invention, a recording apparatus comprising: input means for inputting a moving picture signal; encoding means for encoding the moving picture signal, which has been input by the input means, using intraframe encoding and interframe encoding, and generating an encoded image signal comprising a plurality of picture groups each comprising n (where n represents an integer equal to or greater than 2) frames of an image signal including intraframe-encoded pictures obtained by the intraframe encoding and interframe-encoded pictures obtained by the interframe encoding; recording means for recording the encoded image signal, which has been generated by the encoding means, on a recording medium; transmitting means for transmitting the encoded image signal, which has been generated by the encoding means, to an external device while the signal is in the encoded state; and control means for controlling the recording means, in accordance with a command to start recording of the moving picture signal during transmission of the encoded image signal by the transmitting means, so as to start recording from the leading end of a picture group that contains a frame, which corresponds to the record-start command, in the moving picture signal that has been output from the imaging means.

According to another aspect of the present invention, a recording method comprising: an input step of inputting a moving picture signal; an encoding step of encoding the input moving picture signal using intraframe encoding and interframe encoding, and generating an encoded image signal comprising a plurality of picture groups each comprising n (where n represents an integer equal to or greater than 2) frames of an image signal including intraframe-encoded pictures obtained by the intraframe encoding and interframe-encoded pictures obtained by the interframe encoding; a recording step of recording the encoded image signal on a recording medium; and a control step of controlling the recording step in accordance with a command to start recording of the moving picture signal so as to start recording from the leading end of a picture group that contains a frame, which corresponds to the record-start command, in the input moving picture signal.

According to further aspect of the present invention, a recording method comprising: an input step of inputting a moving picture signal; an encoding step of encoding the input moving picture signal using intraframe encoding and interframe encoding, and generating an encoded image signal comprising a plurality of picture groups each comprising n (where n represents an integer equal to or greater than 2) frames of an image signal including intraframe-encoded pictures obtained by the intraframe encoding and interframe-encoded pictures obtained by the interframe encoding; a recording step of recording the encoded image signal on a recording medium; a transmitting step of transmitting the encoded image signal to an external device while the signal is in the encoded state; and a control step of controlling the recording step, in accordance with a command to start recording of the moving picture signal during transmission of the encoded image signal by the transmitting step, so as to start recording from the leading end of a picture group that contains a frame, which corresponds to the record-start command, in the input moving picture signal.

According to yet further aspect of the present invention, recording method comprising: an input step of inputting a moving picture signal; an encoding step of encoding the input moving picture signal using intraframe encoding and interframe encoding, and generating an encoded image signal comprising a plurality of picture groups each comprising n (where n represents an integer equal to or greater than 2) frames of an image signal including intraframe-encoded pictures obtained by the intraframe encoding and interframe-encoded pictures obtained by the interframe encoding; a recording step of recording the encoded image signal on a recording medium; and a control step of controlling the recording step, in accordance with a command to start recording of the moving picture signal, so as to start recording from a picture group that follows a picture group that contains a frame, which corresponds to the record-start command, in the input moving picture signal.

According to another aspect of the present invention, a recording method comprising: an input step of inputting a moving picture signal; an encoding step of encoding the input moving picture signal using intraframe encoding and interframe encoding, and generating an encoded image signal comprising a plurality of picture groups each comprising n (where n represents an integer equal to or greater than 2) frames of an image signal including intraframe-encoded pictures obtained by the intraframe encoding and interframe-encoded pictures obtained by the interframe encoding; a recording step of recording the encoded image signal on a recording medium; a transmitting step of transmitting the encoded image signal to an external device while the signal is in the encoded state; and a control step of controlling the recording step, in accordance with a command to start recording of the moving picture signal during transmission of the encoded image signal by the transmitting step, so as to start recording from a picture group that follows a picture group that contains a frame, which corresponds to the record-start command, in the input moving picture signal.

According to another aspect of the present invention, a computer-readable medium storing program code for causing a computer to execute the following steps: an input step of inputting a moving picture signal; an encoding step of encoding the input moving picture signal using intraframe encoding and interframe encoding, and generating an encoded image signal comprising a plurality of picture groups each comprising n (where n represents an integer equal to or greater than 2) frames of an image signal including intraframe-encoded pictures obtained by the intraframe encoding and interframe-encoded pictures obtained by the interframe encoding; a recording step of recording the encoded image signal on a recording medium; and a control step of controlling the recording step in accordance with a command to start recording of the moving picture signal so as to start recording from the leading end of a picture group that contains a frame, which corresponds to the record-start command, in the input moving picture signal.

According to another aspect of the present invention, a computer-readable medium storing program code for causing a computer to execute the following steps: an input step of inputting a moving picture signal; an encoding step of encoding the input moving picture signal using intraframe encoding and interframe encoding, and generating an encoded image signal comprising a plurality of picture groups each comprising n (where n represents an integer equal to or greater than 2) frames of an image signal including intraframe-encoded pictures obtained by the intraframe encoding and interframe-encoded pictures obtained by the interframe encoding; a recording step of recording the encoded image signal on a recording medium; a transmitting step of transmitting the encoded image signal to an external device while the signal is in the encoded state; and a control step of controlling the recording step, in accordance with a command to start recording of the moving picture signal during transmission of the encoded image signal by the transmitting step, so as to start recording from the leading end of a picture group that contains a frame, which corresponds to the record-start command, in the input moving picture signal.

According to another aspect of the present invention, a computer-readable medium storing program code for causing a computer to execute the following steps: an input step of inputting a moving picture signal; an encoding step of encoding the input moving picture signal using intraframe encoding and interframe encoding, and generating an encoded image signal comprising a plurality of picture groups each comprising n (where n represents an integer equal to or greater than 2) frames of an image signal including intraframe-encoded pictures obtained by the intraframe encoding and interframe-encoded pictures obtained by the interframe encoding; a recording step of recording the encoded image signal on a recording medium; and a control step of controlling the recording step, in accordance with a command to start recording of the moving picture signal, so as to start recording from a picture group that follows a picture group that contains a frame, which corresponds to the record-start command, in the input moving picture signal.

According to another aspect of the present invention, computer-readable medium storing program code for causing a computer to execute the following steps: an input step of inputting a moving picture signal; an encoding step of encoding the input moving picture signal using intraframe encoding and interframe encoding, and generating an encoded image signal comprising a plurality of picture groups each comprising n (where n represents an integer equal to or greater than 2) frames of an image signal including intraframe-encoded pictures obtained by the intraframe encoding and interframe-encoded pictures obtained by the interframe encoding; a recording step of recording the encoded image signal on a recording medium; a transmitting step of transmitting the encoded image signal to an external device while the signal is in the encoded state; and a control step of controlling the recording step, in accordance with a command to start recording of the moving picture signal during transmission of the encoded image signal by the transmitting step, so as to start recording from a picture group that follows a picture group that contains a frame, which corresponds to the record-start command, in the input moving picture signal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
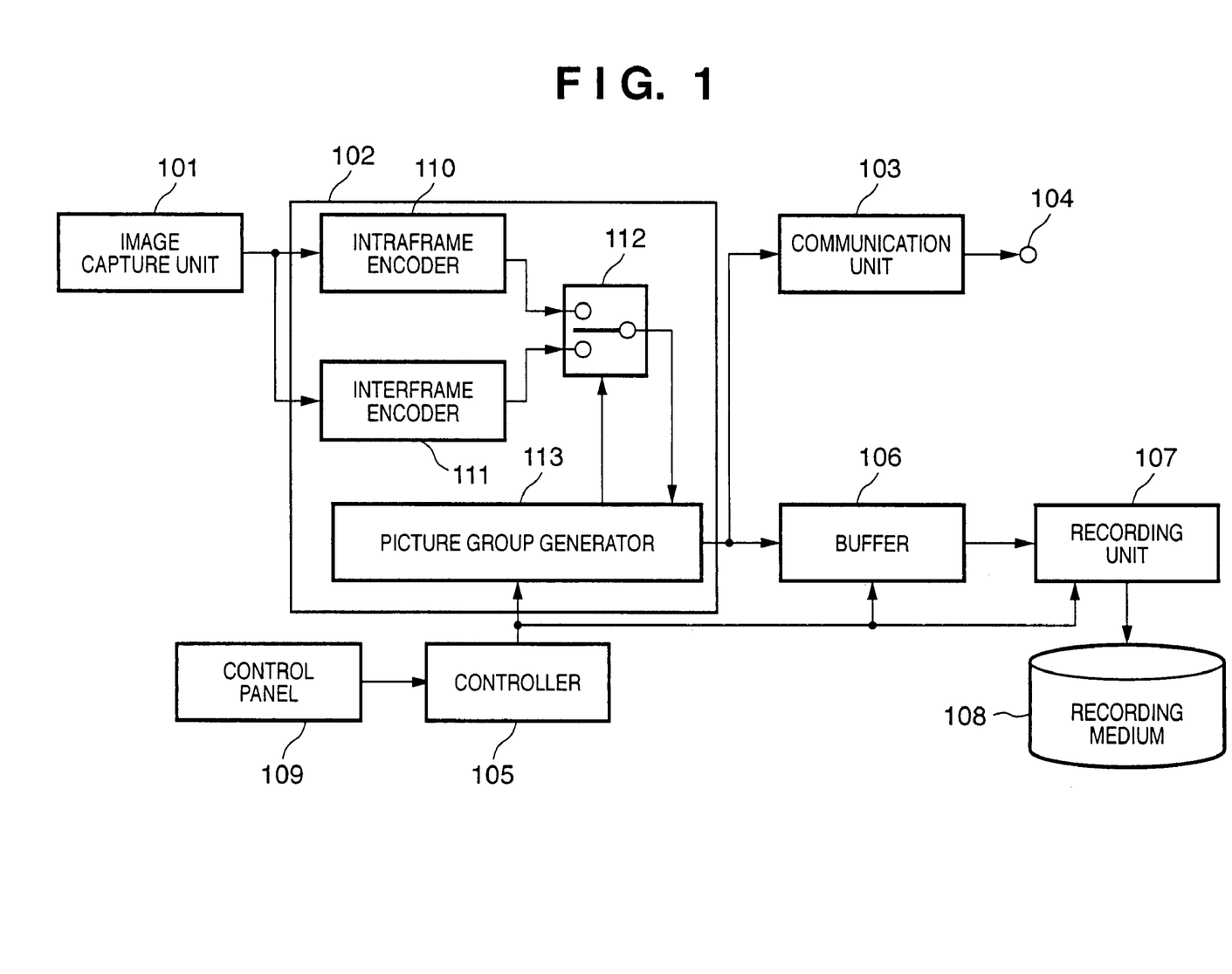
FIG. 1 is a block diagram illustrating an example of the structure of an imaging apparatus according to a first embodiment of the present invention.

FIG. 1 is a block diagram illustrating an example of the structure of an imaging apparatus according to a first embodiment of the present invention.

As shown in FIG. 1, the apparatus includes an image sensor 101, an encoding unit 102, a communication unit 103, a stream output terminal 104, a controller 105, a buffer 106, a recording unit 107, a recording medium 108 and a control panel 109.

The image sensor 101 senses the image of a subject and supplies the encoder 102 with a video signal. The encoding unit 102 encodes the supplied video signal by MPEG encoding and applies the encoded signal to the communication unit 103 and buffer 106.

The encoding unit 102 comprises an intraframe encoder 110, an interframe encoder 111, a selector 112 and a picture group generator 113. The video signal supplied by the image sensor 101 is applied to the intraframe encoder 110 and interframe encoder 111. The intraframe encoder 110 encodes the video signal using correlation within the same frame of the video signal, and the interframe encoder 111 encodes the video signal using correlation between neighboring frames of the video signal.

Both of the video signals encoded by the intraframe encoder 110 and interframe encoder 111 are applied to the selector 112. In accordance with a control signal from the controller 105, the picture group generator 113 supplies the selector 112 with a changeover signal to thereby select either the encoded video signal from the intraframe encoder 110 or the encoded video signal from the interframe encoder 111. The selected encoded video signal is applied to the picture group generator 113. The latter forms the applied encoded video signal into a plurality of groups and applies the groups to the buffer 106 and encoding unit 102 as encoded picture groups.

The buffer 106 is of, e.g., the FIFO type that has a storage capacity capable of storing data equivalent to one encoded picture group that is output by the encoding unit 102. The controller 105 may ascertain the storage address of the data of the leading end of the encoded picture group stored in the buffer 106, or the encoded picture group may be written to the buffer starting from a prescribed address.

In accordance with a prescribed transmission scheme, the communication unit 103 modulates the encoded picture groups supplied by the picture group generator 113 and outputs the modulated signal to the stream output terminal 104. For example, the communication unit 103 transfers video to a television synchronously or outputs the video to a video capture board incorporated in a computer (or to an externally mounted video capture unit).

The communication unit 103 has an interface circuit that corresponds to the stream output terminal 104 and outputs the encoded video signal in accordance with a predetermined protocol. Any terminal capable of outputting a video signal, such as a terminal compliant with IEEE 1394 or a USB terminal, can be utilized as the stream output terminal 104.

The controller 105 includes, e.g., a CPU, a ROM and a RAM, and controls the overall imaging apparatus by executing a program that has been stored in the ROM. Picture-group generation processing, which is executed at the time of a record command and constitutes a characterizing feature of the present invention, also is implemented by having the controller 105 run a program and control each of the necessary components. Of course, it can be so arranged that all or part of this processing is executed by hardware.

In accordance with a prescribed recording scheme, the recording unit 107 modulates the encoded picture group that has been stored in the buffer 106 and records the modulated signal on the recording medium 108. Any recording medium such as a magnetic recording medium or optical recording medium can be utilized as the recording medium 108. For example, the signal can be recorded on a removable recording medium such as a magnetic tape or optical disk.

Figure 2:
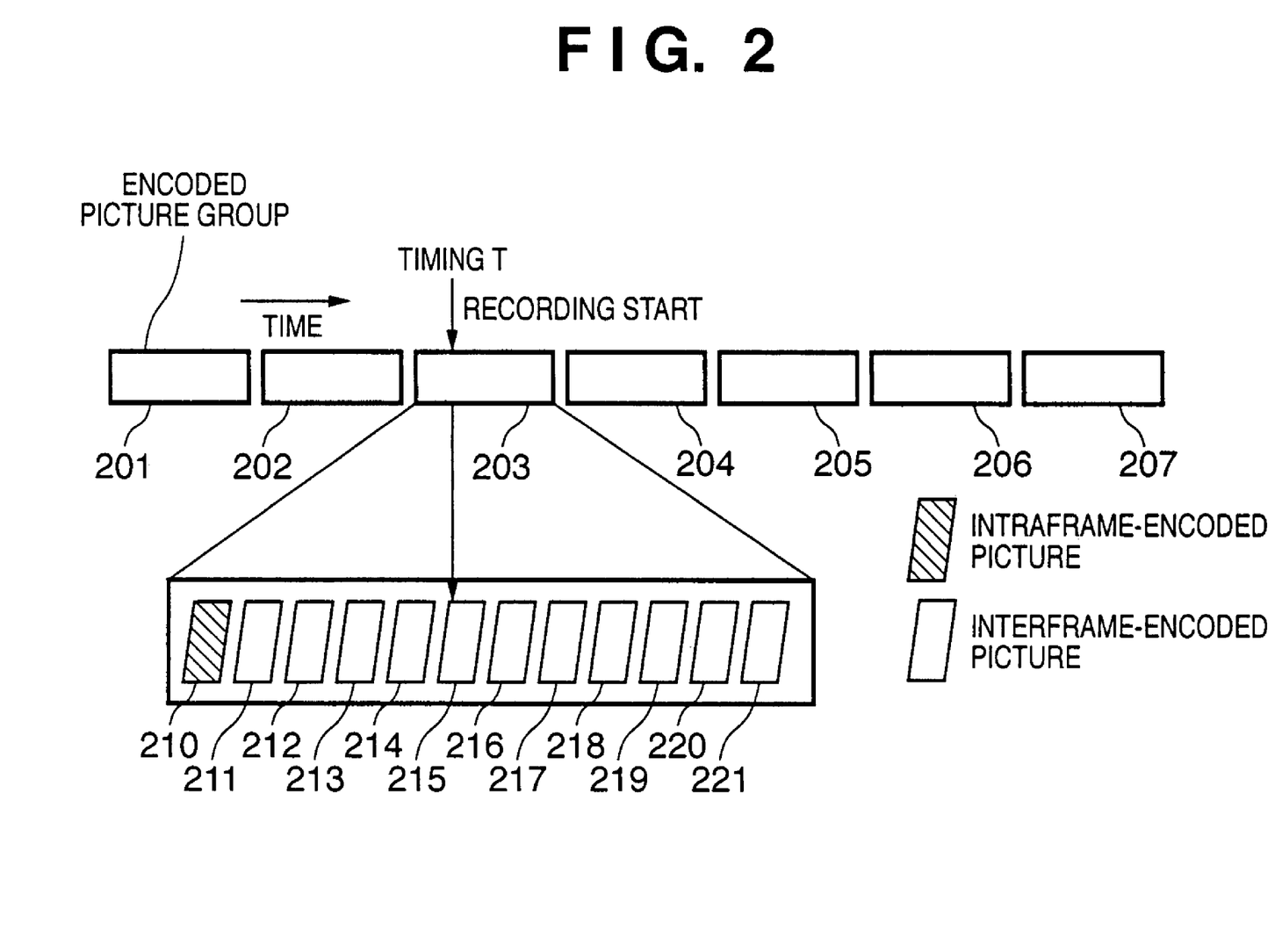
FIG. 2 is a diagram useful in describing the operation of recording processing by the imaging apparatus according to the first embodiment.

The imaging apparatus according to this embodiment is such that while an encoded video signal is being transmitted externally of the apparatus by the communication unit 103, the same encoded video signal can be recorded on the recording medium 108 by the recording unit 107. Reference will be had to FIG. 2 to describe the operation of the imaging apparatus of this embodiment in a case where an operation specifying the start of recording is performed at, e.g., the control panel 109, while transmission of an encoded video signal from the stream output terminal 104 is in progress.

In a manner similar to that of FIG. 5, FIG. 2 is a diagram illustrating a sequence of encoded picture groups, which are output by the encoding unit 102 (namely by the picture group generator 113), and the structure of each picture group. As illustrated in FIG. 2, it is assumed that the imaging apparatus of this embodiment also is such that each of picture groups 201 to 207 has one intraframe-encoded picture 210 (an I picture) and a plurality of interframe-encoded pictures (P pictures or B pictures) 211 to 221.

Consider a case where start of recording has been commanded at, e.g., timing T in FIG. 2, namely at a timing corresponding to picture 215 in picture group 203. Upon receiving a record command from, e.g., the control panel 109, the controller 105 applies a control signal to the buffer 106 and recording unit 107, thereby initiating the recording of picture group 203, which is being retained in the buffer 106, on the recording medium 108 from the leading end of this picture group (namely from the intraframe-encoded picture 210 disposed at the leading end of picture group 203).

This is followed by reading out the encoded video signal, which has been output from the encoding unit 102 and written to the buffer 106, and continuing with the recording of the signal by the recording unit 107. If a halt to recording is commanded, the controller 105 controls the buffer 106 and recording unit 107, thereby stopping the read-out of the encoded video signal from the buffer 106 and halting the recording operation performed by the recording unit 107. In this embodiment, recording is halted after the completion of recording of all data in the picture group that contains the picture prevailing at the moment the halting of recording was commanded. However, recording may just as well be halted at the moment the halt command is issued.

As a result, the encoded picture group is not split on the recording medium 108 and the intraframe-encoded picture and all of the interframe-encoded pictures of the picture group that contains the picture prevailing at the moment the record command was issued are recorded. Accordingly, the leading picture group prevailing at playback time also is reproduced normally and no loss of video occurs.

According to this embodiment, pictures prior to the commanding of start of recording, namely pictures 210 to 213 earlier than timing T at which the start of recording was commanded, also are recorded, and therefore video from farther in the past than the operator intended is reproduced at playback time. However, if it is so arranged that information capable of identifying a picture corresponding to the record command in the picture group at the time of playback is recorded by some method, such as by having the picture group generator 113 respond to a control signal from the controller 105 by recording information that can be identified by the recording unit 107, such as the number of the picture in the picture group, in the header information of this picture group, and if pictures prior to the record-start command position are skipped at the time of playback, then the only video reproduced will be that starting from the timing intended by the operator. A similar effect can be obtained by recording information that is capable of identifying pictures to be skipped and then skipping these pictures at playback time.

Thus, this embodiment is such that in a case where a video signal is encoded by the MPEG scheme and the start of recording is commanded in a state in which the encoded video signal is being transmitted to the exterior of the apparatus, recording on a recording medium is started from the leading end of a picture group that includes the picture corresponding to the record-start command. As a result, the picture at which the start of recording was commanded can be decoded correctly and it is possible to prevent the loss of pictures at the leading end at the time of playback.

Further, the encoded video signal output from the communication unit 103 at this time can be prevented from being split partway through a picture group and, hence, loss of pictures can be avoided.

Second Embodiment

An imaging apparatus according to a second embodiment of the present invention will now be described. It should be noted that the imaging apparatus of this embodiment can be implemented by an arrangement the same as that of the imaging apparatus of the first embodiment, and that the only difference is the operation performed when recording is commanded. The structural components of the second embodiment, therefore, need not be described.

Figure 3:
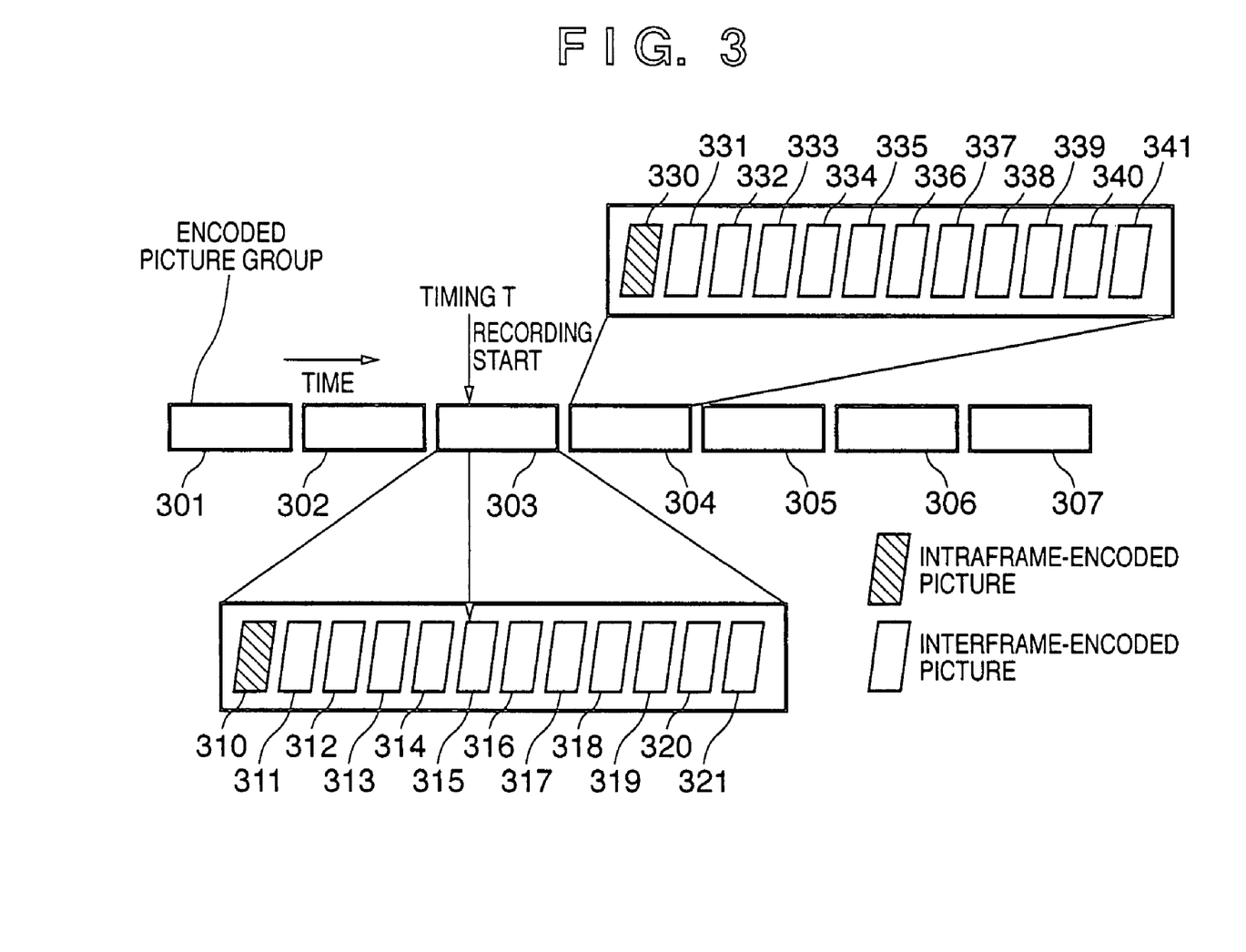
FIG. 3 is a diagram useful in describing the operation of recording processing by an imaging apparatus according to a second embodiment of the present invention.

Reference will be had to FIG. 3 to describe operation in a case where the imaging apparatus of this embodiment has received a command to start recording. Specifically, in a manner similar to that of FIG. 2, FIG. 3 is a diagram illustrating a sequence of encoded picture groups, which are output by the encoding unit 102 (namely by the picture group generator 113), and the structure of each picture group. As illustrated in FIG. 3, it is assumed that the imaging apparatus of this embodiment also is such that each of picture groups 301 to 307 has one intraframe-encoded picture (an I picture) and a plurality of interframe-encoded pictures (P pictures or B pictures).

Consider a case where start of recording has been commanded at, e.g., timing T in FIG. 3, namely at a timing corresponding to picture 315 in picture group 303. Upon receiving a record command from, e.g., the control panel 109, the controller 105 applies a control signal to the buffer 106 and recording unit 107, thereby discarding, from the encoded video signal that is being held in the buffer 106, all other pictures contained in the picture group (picture group 303) that is the same as that of the picture 315, and starts the recording of the next picture group 304 on the recording medium 108 from the leading end of this picture group. As a result, the encoded picture group is not split on the recording medium 108 and the intraframe-encoded picture and all of the interframe-encoded pictures remain recorded as is. This means that no loss of video will occur at playback time.

As in the first embodiment, this is followed by processing for recording the encoded video signal and processing executed in a case where a halt to recording is commanded.

In the first and second embodiments described above, the stream that is output by the communication unit 103 is the output of the picture group generator 113 per se regardless of whether or not there is an operation to start recording. As a result, the encoded video signal that is output from the stream output terminal 104 will not develop a problem such as splitting in mid-course. This makes it possible to perform communication in ideal fashion.

Other Embodiments

The above embodiments have been described with regard to an imaging apparatus having an image sensor. However, it goes without saying that the present invention is applicable also to a recording apparatus, which does not have the image sensor 101, for recording image data that has been captured by an external device.

Further, in the above embodiments, the only case described is one in which each picture group generated by the picture group generator 113 has only one intraframe-encoded picture. However, in a case where pictures necessary for normal reproduction are smaller in number than the number of all pictures contained in one picture group and these pictures are successive, as when a plurality of intraframe-encoded pictures are contained in one picture group, the present invention can be applied in similar fashion with regard to the minimum unit of successive pictures capable of being reproduced normally.

More specifically, the essence of the present invention is that in a case where start of recording is commanded in partway through a picture group composed of a plurality of pictures necessary to perform normal reproduction, recording is performed from the beginning of this picture group or the picture group is discarded and recording is performed starting from the next picture group. Accordingly, the storage capacity of the buffer 106 need only be decided appropriately depending upon the size of the picture group and is not limited to the content described in the above embodiments. In addition, the encoding scheme is not limited to the MPEG encoding scheme as a matter of course.

Though an imaging apparatus comprising a single device has been described in the above embodiments, functions equivalent to those of the imaging apparatus of the present invention may also be implemented by a system constituted by a plurality of devices.

It should be noted that the present invention also covers a case where software programs for implementing the functions of the above embodiments are supplied directly from a recording medium, or through use of wired/wireless communication, to a system or apparatus having a computer that is capable of executing the above-mentioned programs, and the system or apparatus executes the supplied programs to thereby implement the equivalent functions.

Accordingly, program code per se supplied to and installed in a computer in order that the computer may execute the processing of the present invention also implements the invention. In other words, the computer program that implements the processing of the present invention also is covered by the present invention.

In this case, so long as the system or apparatus has the functions of the program, the form of the program, e.g., object code, a program executed by an interpreter or script data supplied to an operating system, etc., does not matter.

Examples of recording media by which the program can be supplied are magnetic recording media such as floppy disk, hard disk and magnetic tape, optical/magneto-optical storage media such as a magneto-optical disk, CD-ROM, CD-R, CD-RW, DVD-ROM, DVD-R and DVD-RW, and a non-volatile semiconductor memory.

As for the method of supplying the program using wired/wireless communication, the computer program itself for forming the present invention in the server of a computer network, or a data file (program-data file) that can serve as a computer program for forming the present invention in a client computer, such as a compressed file having an automatic install function, can be stored and the program-data file can be downloaded to a connected client computer. In such case the program-data file can be divided into a plurality of segment files and the segment files can be deployed at different servers.

In other words, the present invention also covers a server apparatus that allows multiple users to download a program-data file for the purpose of implementing the functions of the present invention by computer.

Further, it is also possible to encrypt and store the program of the present invention on a storage medium such as a CD-ROM, distribute the storage medium to users, allow users who meet certain requirements to download decryption key information from, e.g., a website via the Internet, and allow these users to run the encrypted program by using the key information, whereby the program is installed in the user computer.

Furthermore, besides the case where the aforesaid functions according to the embodiments are implemented by executing the read program by computer, an operating system or the like running on the computer can perform all or a part of the actual processing based upon commands in the program so that the functions of the foregoing embodiments are be implemented by this processing.

Furthermore, after the program read from a recording medium is written to a function expansion board inserted into the computer or to a memory provided in a function expansion unit connected to the computer, a CPU or the like mounted on the function expansion board or function expansion unit can perform all or a part of the actual processing based upon commands in the program so that the functions of the foregoing embodiments can be implemented by this processing.

Thus, in accordance with the present invention, as described above, it is possible to suppress loss of video at playback with regard to both an encoded video signal that is transmitted and an encoded video signal that is recorded even in a case where recording has been commanded with regard to a video signal during the transmission of this video signal encoded using both intraframe encoding and interframe encoding.

As many apparently widely different embodiments of the present invention can be made without departing from the spirit and scope thereof, it is to be understood that the invention is not limited to the specific embodiments thereof except as defined in the appended claims.

What is claimed is:

1. An imaging apparatus comprising:
   an image capture unit;
   an encoding unit configured to encode a moving picture signal output by said image capture unit, using intraframe encoding and interframe encoding, and to generate an encoded image signal comprising a plurality of picture groups each comprising n (where n represents an integer equal to or greater than 2) frames of an image signal including intraframe-encoded pictures obtained by the intraframe encoding and interframe-encoded pictures obtained by the interframe encoding;
   an instruction unit configured to provide an instruction to start a recording of the encoded image signal, wherein the instruction is detected when a frame of a picture group is an interframe-encoded picture;
   a recording unit configured to record, in response to the instruction, the encoded image signal generated by said encoding unit, on a recording medium;
   a communications unit configured to communicate the encoded image signal generated by said encoding unit to an external device while the signal is in an encoded state; and
   a controller configured to control, upon detection of the instruction while the encoded image signal is being transmitted to the external device, said recording unit to start recording the encoded image signal,
   wherein said controller controls said recording unit to record the encoded image signal from a beginning of the picture group containing the frame of the picture group corresponding to when the instruction is detected.

2. The apparatus according to claim 1, wherein said recording unit has a memory for storing the equivalent of one picture group of the moving picture signal generated by said encoding unit.

3. The apparatus according to claim 1, wherein said controller further controls said recording unit so as to record identification information, which indicates the frame corresponding to when the instruction was detected, in the picture group at the portion where recording starts.

4. The apparatus according to claim 1, wherein said controller controls said encoding unit and said recording unit to start recording by said recording unit if the frame corresponding to when the instruction is an interframe-encoded picture without the frame corresponding to the instruction being encoded as an intraframe-encoded picture.

5. The apparatus according to claim 1, wherein the leading frame of each picture group is the intraframe-encoded picture.

6. A recording apparatus comprising:
   an input unit configured to input a moving picture signal;
   an encoding unit configured to encode the moving picture signal input by said input unit, using intraframe encoding and interframe encoding, and to generate an encoded image signal comprising a plurality of picture groups each comprising n (where n represents an integer equal to or greater than 2) frames of an image signal including intraframe-encoded pictures obtained by the intraframe encoding and interframe-encoded pictures obtained by the interframe encoding;
   an instruction unit configured to provide an instruction from a user to start a recording of the encoded image signal, wherein the instruction is detected when a frame of a picture group is an interframe-encoded picture;
   a recording unit configured to record, in response to the instruction, the encoded image signal generated by said encoding unit, on a recording medium;

a communication unit configured to communicate the encoded image signal generated by said encoding unit, to an external device while the signal is in an encoded state; and a controller configured to control, upon detection of the instruction while the encoded image signal is being transmitted to the external device, said recording unit to start recording the encoded image signal, wherein said controller controls said recording unit to record the encoded image signal from a beginning of the picture group containing the frame of the picture group corresponding to when the instruction is detected.

7. A recording method comprising:

an input step of inputting a moving picture signal;

an encoding step of encoding the input moving picture signal using intraframe encoding and interframe encoding, and generating an encoded image signal comprising a plurality of picture groups each comprising n (where n represents an integer equal to or greater than 2) frames of an image signal including intraframe-encoded pictures obtained by the intraframe encoding and interframe-encoded pictures obtained by the interframe encoding;

a detection step of detecting an instruction instructing a start of a recording of the encoded image signal, wherein the instruction is detected when a frame of a picture group is an interframe-encoded picture;

a recording step of recording, in response to the instructing, the encoded image signal on a recording medium;

a transmitting step of transmitting the encoded image signal to an external device while the signal is in an encoded state; and a control step of controlling, upon detection of the instruction while the encoded image signal is being transmitted to the external device, said recording step to start recording the encoded image signal, wherein said control step controls said recording step to record the encoded image signal from a beginning of the picture group containing the frame of the picture group corresponding to when the instruction is detected.

8. The recording apparatus according to claim 6, further comprising a buffer memory configured to store a plurality of frames of the encoded image signal encoded by said encoding unit, wherein said controller controls, if the frame is the interframe picture, said recording unit to read out the encoded image signal from the buffer unit from the beginning of the picture group and to record the read image signal.

9. A recording apparatus comprising:

an input unit configured to input a moving picture signal;

an encoding unit configured to encode the moving picture signal input by said input unit, using intraframe encoding and interframe encoding, and to generate an encoded image signal;

an instruction unit configured to provide an instruction from a user to start a recording of the encoded image signal, wherein the instruction is detected when a frame of a picture group is an interframe-encoded picture;

a recording unit configured to record, in response to the instruction, the encoded image signal generated by said encoding unit, on a recording medium;

a communication unit configured to communicate the encoded image signal generated by said encoding unit, to an external device while the signal is in an encoded state; and a controller configured to control, upon detection of the instruction while the encoded image signal is being transmitted to the external device, said recording unit to start recording the encoded image signal, wherein said controller controls said recording unit to record the encoded image signal from a frame that is an intraframe-encoded picture and is required to decode the frame of the picture group corresponding to when the instruction is detected.

10. The apparatus according to claim 9, further comprising:

a buffer memory configured to store a plurality of frames of the encoded image signal encoded by said encoding unit, wherein said controller controls, if the frame corresponding to when the instruction is detected is the interframe picture, said recording unit to read out the image signal starting from the frame, starting the frame required to decode the frame corresponding to when the instruction is detected from the buffer unit and to record the read image signal.

* * * * *